(12) United States Patent
Wilkinson

(10) Patent No.: US 10,846,792 B1
(45) Date of Patent: Nov. 24, 2020

(54) ON-LINE LOAN PROCESS AND SYSTEM

(71) Applicant: UIPCO, LLC

(72) Inventor: Carlos W. Wilkinson, San Antonio, TX (US)

(73) Assignee: UIPCO, LLC, San Antonio, TX (US)

(*) Notice: Subject to any disclaimer, the term of this patent is extended or adjusted under 35 U.S.C. 154(b) by 550 days.

(21) Appl. No.: 15/403,431

(22) Filed: Jan. 11, 2017

Related U.S. Application Data

(60) Provisional application No. 62/277,350, filed on Jan. 11, 2016.

(51) Int. Cl.
*G06Q 40/02* (2012.01)
*G06Q 50/16* (2012.01)

(52) U.S. Cl.
CPC .......... *G06Q 40/025* (2013.01); *G06Q 50/16* (2013.01)

(58) Field of Classification Search
CPC .................................................. G06Q 40/025
USPC .............................................................. 705/38
See application file for complete search history.

(56) References Cited

U.S. PATENT DOCUMENTS

| | | | | |
|---|---|---|---|---|
| 7,472,089 | B2 * | 12/2008 | Hu | G06Q 40/00 |
| | | | | 705/38 |
| 8,306,908 | B1 * | 11/2012 | Barker | G06Q 30/0224 |
| | | | | 705/14.26 |
| 2001/0047326 | A1 * | 11/2001 | Broadbent | G06Q 10/10 |
| | | | | 705/38 |
| 2003/0041019 | A1 * | 2/2003 | Vagim, III | B82Y 15/00 |
| | | | | 705/38 |
| 2004/0083164 | A1 * | 4/2004 | Schwartz | G06Q 10/10 |
| | | | | 705/38 |
| 2015/0339769 | A1 * | 11/2015 | deOliveira | G06Q 40/025 |
| | | | | 705/38 |
| 2017/0034172 | A1 * | 2/2017 | Biggs | H04L 63/08 |

OTHER PUBLICATIONS

Bartlett, M. (2015). America first offers mobile loan app, special offers. Credit Union Journal, 19(9), 18. Retrieved from https://search.proquest.com/docview/1678173755?accountid=14753 (Year: 2015).*

* cited by examiner

*Primary Examiner* — Jessica Lemieux
(74) *Attorney, Agent, or Firm* — Locke Lord LLP; Christopher J. Capelli

(57) ABSTRACT

An apparatus and computerized method for automated loan origination processing via a computer system with communications devices for receiving loan application data and user provided information. Logic mechanisms programmed to automatically generate a loan origination compliance task workflow having an organized sequence of a plurality of compliance tasks in response to the loan application data received from a user. Receiving at a central computer server a loan application having information provided by the user via the user computer terminal and acquiring at the central computer server electronic data relating to the user from one or more databases responsive to receiving the user loan application information. Initiate a review process for the loan application utilizing the user provided information and data acquired from the one or more databases and render an approval decision for the electronic loan application based upon the review process.

9 Claims, 4 Drawing Sheets

ON-LINE LOAN PROCESS AND SYSTEM

CROSS REFERENCE TO RELATED APPLICATIONS

This application claims priority to U.S. Patent Application Ser. No. 62/277,350 filed Jan. 11, 2016 which is incorporated herein by reference in its entirety.

FIELD OF THE INVENTION

The disclosed embodiments generally relate to electronic processing of loan applications, and more particularly, to an improved method and system for rapidly processing of loan applications.

BACKGROUND OF THE INVENTION

As personal computers and the Internet, network, wireless, and other telecommunications technologies have become more widely used, the need has increased for cost-effective safeguards that preserve the security of transmissions, the privacy of personal, sensitive, or legally-significant information, and the integrity and reliability of documents and related information. There has been a concomitant increase in the need for the web enabling of traditional paper processes. In light of these advances, it is no longer practical for many individuals and businesses to generate, collect, record, process, use, and store information without encoding the information in a computer-usable, electronic form. Nor is it practical for many individuals and businesses to continue to employ traditional paper business processes now that it is possible for many traditional paper processes to be conducted in electronic or digital form using these new telecommunications technologies.

A number of computer methods for processing mortgages are known. The invention disclosed below provides a computerized method and apparatus for simplifying and rapidly processing mortgage loan application process via an electronic processing method and system via user interfacing software and/or a User Graphical Interface (GUI).

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, electronic processing of loans and mortgage loans is described in which users are enabled to create, upload, view and collaborate on digital and electronic documents and use electronic or digital signatures so that the content and form of documents are rendered persistent. It allows these documents to be executed with legally-binding and non-repudiable electronic or digital signatures by parties to be bound by the documents and by parties approving the form and content of the documents, and by parties witnessing or authenticating the documents or signatories thereto; it allows the documents to be reposed for short periods or archived for long periods of time; it allows documents packages to be transmitted to interested parties; and it allows documents to be reposed with trustee custodians; and it allows documents to be date-stamped, time-stamped, and signed by these trustee custodians in order to create "originals" with a traceable and reportable chain of custody and certifiable to courts and other authorities.

An aspect of the invention includes the systems and methods for soliciting loan applications, collecting relevant information from pertinent parties, verifying such information, creating or assembling related or verifying documents, preparing Loan Documents for review and execution, executing loan documents and related information with legally binding signatures, reposing and transmitting such Loan Documents to loan processors, purchasers or other parties, and archiving such Loan Document on behalf of authorized parties.

Another aspect relates to systems and methods operating in a technological and legal environment in which (1) such Loan Documents may be processed in an Internet, network, wireless, or other telecommunication environment; (2) all of the Loan Documents are in digital or electronic form; (3) the system and methods for the preparation, signing, witnessing, using, reposing, archiving, and transmission of such Loan Documents are conducted digitally or electronically; (4) all of the foregoing systems and methods as well as all or part of the Loan Documents are rendered secure, private, or reliable by the use of passwords, cryptographic keys, public key cryptography and infrastructure, or legal-based or fiduciary-based data management vaulting and processing systems; (5) one or more passwords, cryptographic keys, public keys are employed by one or more entities (a) to assure the identity of parties preparing, creating, altering, reviewing, executing, witnessing, processing, using, reposing, transmitting, or archiving such Loan Documents or related information or (b) to assure the accuracy, security, reliability, form, content, persistence of form and content, chain of custody, evidentiary admissibility, archival status, records retention status, or the date, time, place and mode of execution thereof.

Another aspect of the invention includes an a computerized apparatus for automated loan origination processing via a computer system with communications devices for receiving loan application data and user provided information. Logic mechanisms programmed to automatically generate a loan origination compliance task workflow having an organized sequence of a plurality of compliance tasks in response to the loan application data received from a user. Receiving at a central computer server a loan application having information provided by the user via the user computer terminal and acquiring at the central computer server electronic data relating to the user from one or more databases responsive to receiving the user loan application information. Initiate a review process for the loan application utilizing the user provided information and data acquired from the one or more databases and render an approval decision for the electronic loan application based upon the review process.

A purpose of the illustrated embodiments is to provide an electronic system and method that provides for minimal requirements and data generation (e.g., documents) from a borrower applicant while providing rapid processing of loan applications.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
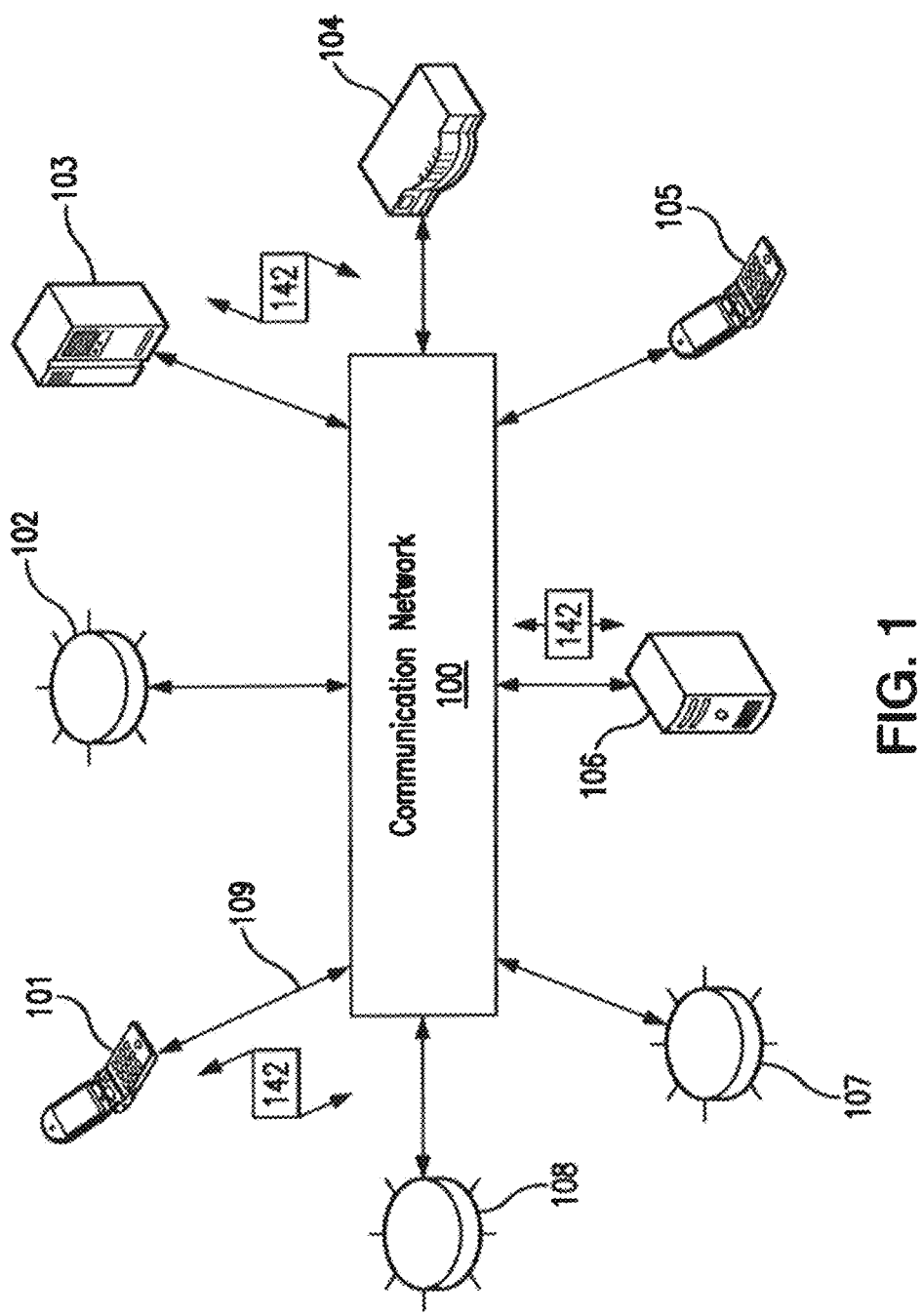
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
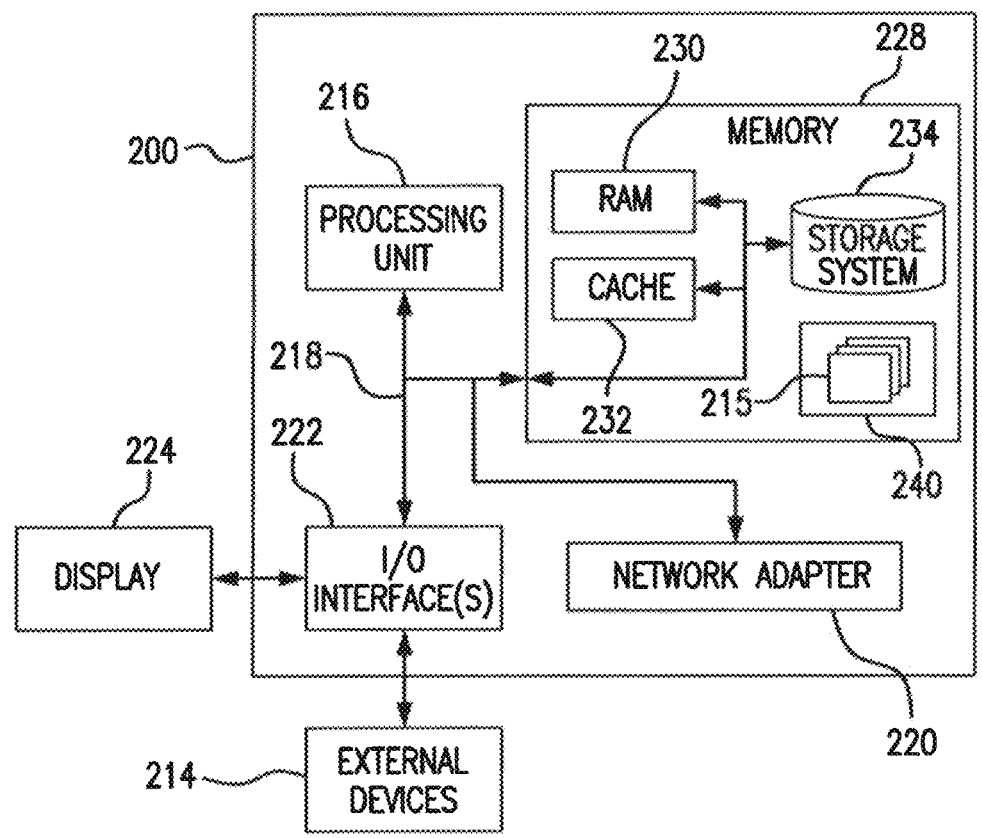
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media and/or Solid State Drives (SSD) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
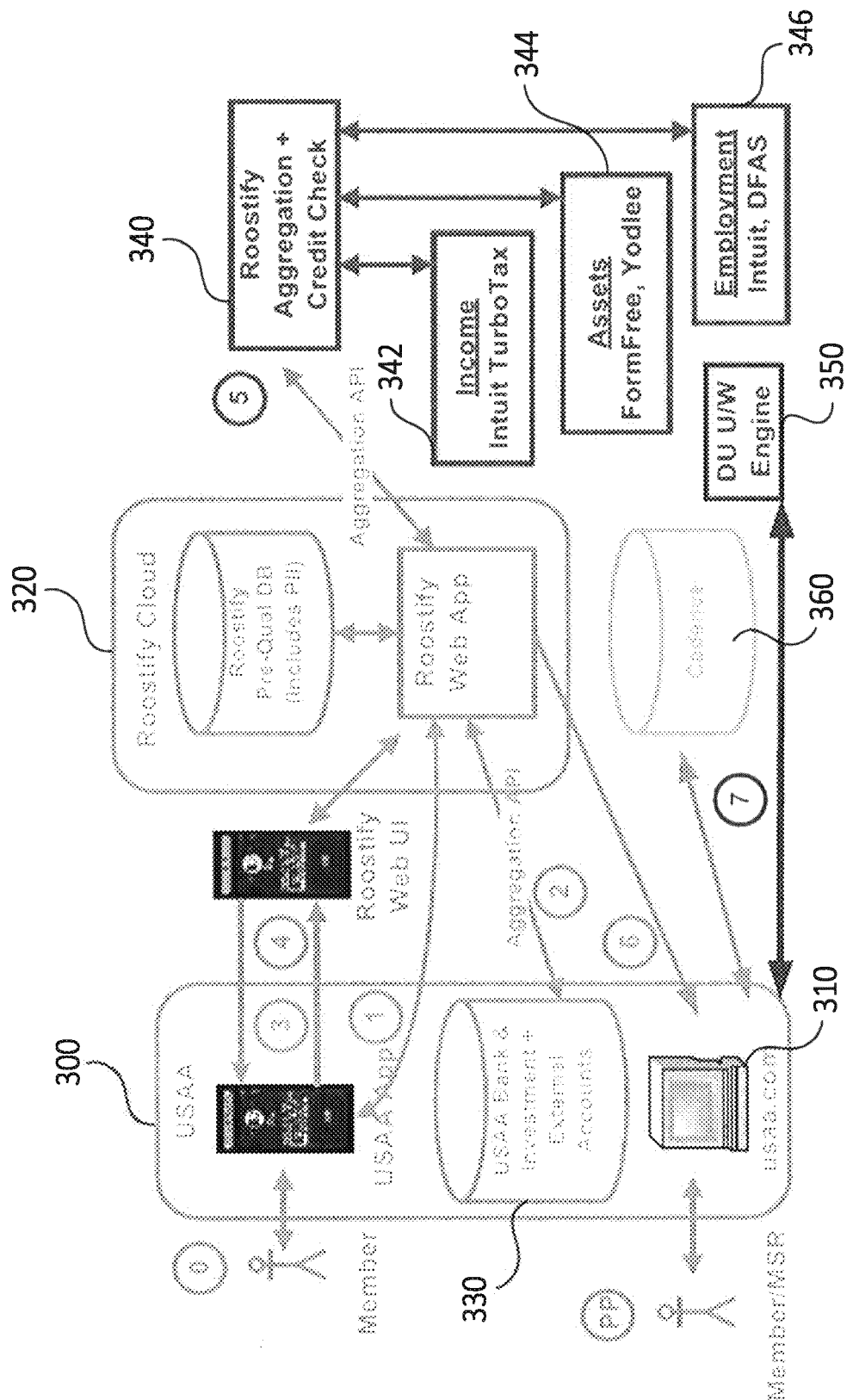
FIG. 3 illustrates an example of a computer networked system in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, shown is a computer networked system for processing loan applications in accordance with an illustrated embodiment. Each of the system components illustrated in FIG. 3 are to be understood to include one or more components of the computer 200 illustrated in FIG. 2 and integrated in the network illustrated in FIG. 1. It is to be also understood that while an illustrated embodiment makes reference to processing a mortgage loan application, the invention is not to be understood to be limited thereto as it may encompass any type of loan application suitable for processing with the present invention, including, but not limited to, home equity loans, vehicle loans and personal loans.

Figure 4:
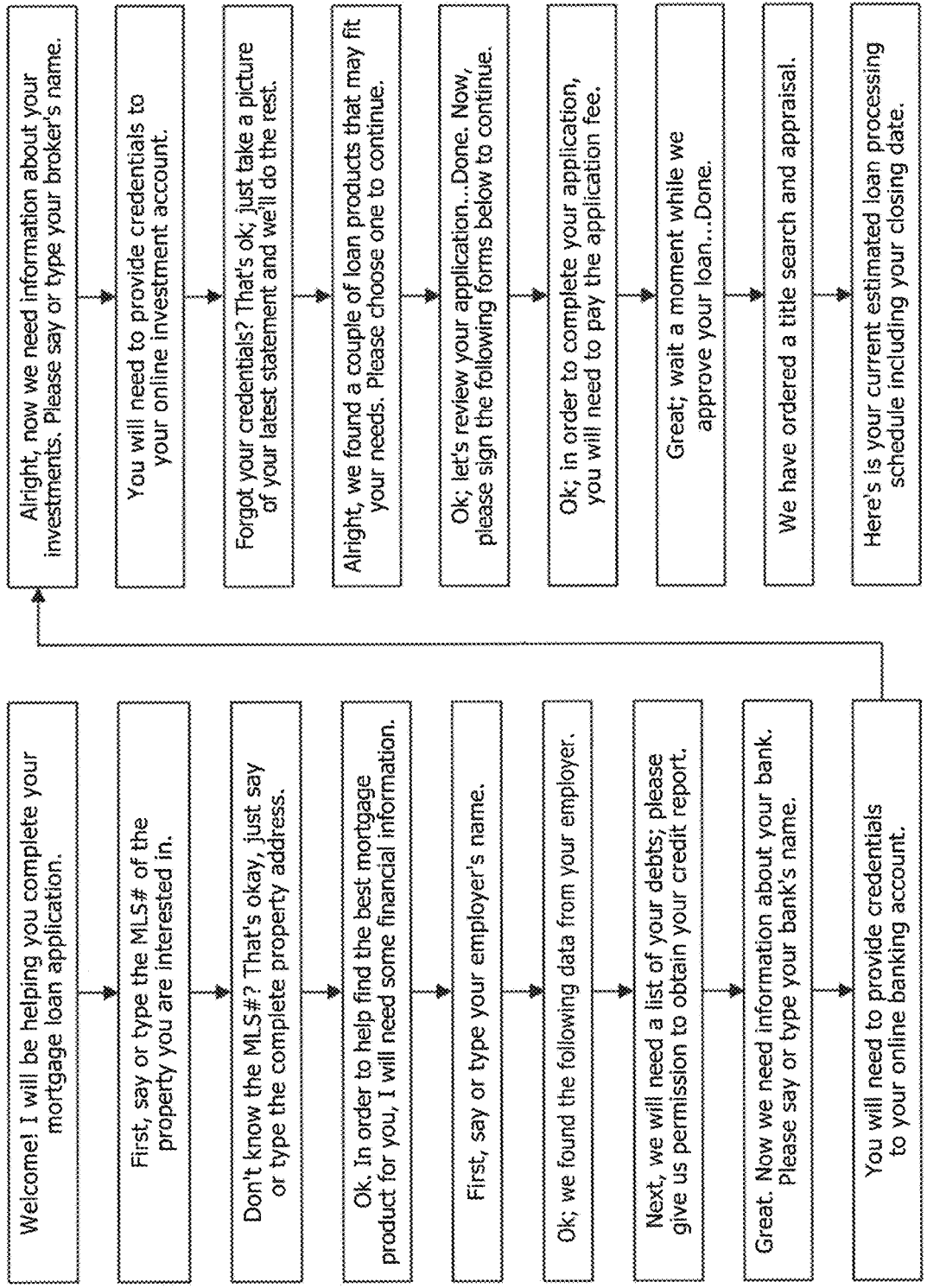
FIG. 4 illustrates information gathering queries presented to a user by the computer networked system of FIG. 3

In operation, a user (e.g., loan applicant) accesses a computing device 300 to initiate a loan application process (see, arrow "0"). With reference now to FIG. 4, shown are exemplary questions which may be queried to the user regarding the loan application via the user's computing device 300 (e.g., a smartphone) in connection with user initiation of the loan application process. The computing device 300 may encompass any suitable computing device having the appropriate GUI and software, such a desktop computer, laptop, kiosk device or any suitable portable computing device such as a tablet and smart phone device. The computing device 300 may access software executing on a remote computer (e.g., a cloud server) or may have specific software installed thereon (e.g., an "app" installed on a tablet and/or smart phone device). In the illustrated embodiment of FIG. 3, the computer device 300 is preferably a smart phone device. The user provided loan application information is received by a computer server 310 (which is preferably associated with the loan provider, such as USAA™). The computer server 310 preferably sends a one-time Oauth2 token to a third party data acquirer/aggregator 320 (e.g., such as ROOSTIFY™) for enabling the processing of the loan application as described herein (see, arrow "1").

In processing the loan application, the third party data acquirer/aggregator 320 retrieves information needed for the loan application (either to supplement the user provided information and/or authenticate the user provided information) by selectively aggregating user information from databases associated with the loan provider (which the user preferably has a preexisting account with) and/or from other third party databases 340 having information regarding the user and relevant to the present loan application (see arrow "2"). For instance, such information may include user income information 342 regarding user income 342 (e.g., retrieved from INUIT TURBOTAX); user asset information 344 (e.g., retrieved from FORMFREE and/or YODLEE) and user employment information 346 (e.g., retrieved from INTUIT and/or DFAS).

In processing the loan application, the loan provider computer server 310 preferably obtains unique session credentials so as to redirect the user to a GUI associated with the third party data acquirer/aggregator 320 (see, arrow "3"). Thereafter, the user may input additional user data/credentials into the third party data acquirer/aggregator 320 as directed (see, arrow "4"). The third party data acquirer/aggregator 320 then preferably leverages the aforementioned aggregation databases to complete the user loan application (see, arrow "5"). Thereafter, the user's loan application is returned to the loan provider computer server 310 (in which a status engine is preferably employed) (see, arrow "6"). It is to be appreciated the actual loan decision based on the aforesaid gathered data may be performed (via a DU underwriting engine 350) by either the loan provider or a third party 360 (e.g., CADENCE™)(see, arrow "7").

Thus, what is described is a computerized system and method that requires minimal user involvement for compiling and rendering a decision regarding a loan application, such as a mortgage application. For instance, the user may merely interact with an app on their smart phone device to provide threshold information (e.g., identity, loan type and amount) whereby the present invention performs all other requirements greatly easing the application process for the user while providing more accurate information for the loan application (e.g., information is gathered from verified data received from databases as opposed to unverified user entered data). It also provides for system that rapidly processes a loan application as opposed to the more conventional manual intensive process.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer method for processing a loan application between a user mobile computer device and a remotely located computer server, comprising:
   providing an electronic loan application from a computer server to a remotely located user mobile computer device via a computer network;
   entering data associated with the electronic loan application in the user mobile device by the user via a GUI provided on the user mobile computer device to be transmitted from the user mobile device to the computer server via the network;
   receiving at the computer server the loan application data transmitted from the user mobile computer device via the network;
   responsive to receiving the user loan application data, the computer server sends a one-time Oauth2 token to a data aggregator to establish secured communication between the computer server and the data aggregator;
   obtain unique session credentials associated with the user mobile computing device to redirect a user of the user mobile computing device to a GUI associated with the data aggregator;
   acquire, decrypt and aggregate by the data aggregator electronic data relating to the user loan application data from each of the following databases communicatively coupled to the data aggregator: i) a credit check database; ii) an income tax database; iii) an asset database; and iv) an employment database;
   responsive to acquiring the electronic data from the data aggregator, provide the unique session credentials from the computer server to the user mobile computer device;
   enabling the user to interact with the data aggregator, upon acquiring the unique session credentials and being redirected to the GUI associated with the data aggregator, to provide additional data to the data aggregator via the user mobile computer device;
   provide a review process for the loan application utilizing the user provided information and data acquired from the data aggregator;
   render an approval decision for the electronic loan application based upon the review process; and
   provide electronic notification of rendered decisions to the user.

2. The method as recited in claim 1, wherein the loan application is a mortgage application.

3. The method as recited in claim 1, wherein the loan application is a vehicle loan application.

4. The method as recited in claim 1, wherein the loan application is a home equity loan application.

5. The method as recited in claim 1, wherein the loan application is a personal loan application.

6. The method as recited in claim 1, wherein the user mobile computer device is a smart phone device.

7. The method for computer processing a loan application as recited in claim 1, wherein the approval decision is rendered by a company issuing a loan from the loan application.

8. The method for computer processing a loan application as recited in claim 1, wherein the approval decision is rendered by a third party relative to a company issuing a loan.

9. The method for computer processing a loan application as recited in claim 1, further allowing one or more digital signatures to be applied to a loan document.

* * * * *